(12) United States Patent
Ma et al.

(10) Patent No.: US 11,677,231 B2
(45) Date of Patent: Jun. 13, 2023

(54) SINGLE-PHASE RECLOSING METHOD, DEVICE AND STORAGE MEDIUM FOR AC/DC SYSTEM

(71) Applicant: NORTH CHINA ELECTRIC POWER UNIVERSITY, Beijing (CN)

(72) Inventors: Jing Ma, Beijing (CN); Chen Liu, Beijing (CN); Jiaming Zhang, Beijing (CN); Min Zhang, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 0 days.

(21) Appl. No.: 17/372,269

(22) Filed: Jul. 9, 2021

(65) Prior Publication Data

US 2022/0021201 A1    Jan. 20, 2022

(30) Foreign Application Priority Data

Jul. 15, 2020    (CN) .......................... 202010680755.6

(51) Int. Cl.
*H02H 7/125* (2006.01)
*H02H 1/00* (2006.01)

(52) U.S. Cl.
CPC .......... *H02H 7/125* (2013.01); *H02H 1/0007* (2013.01); *H02H 1/0092* (2013.01)

(58) Field of Classification Search
CPC ........ H02H 1/0092; H02H 1/04; H02H 7/125; H02H 7/1252; H02H 7/1255; H02H 7/1257; H02H 7/222; H02H 1/0007; H02H 1/0053
See application file for complete search history.

(56) References Cited

U.S. PATENT DOCUMENTS

| 4,335,413 A | * | 6/1982 | Engel | H01H 73/14 340/292 |
| 5,559,719 A | * | 9/1996 | Johnson | G01R 23/10 361/87 |
| 6,289,267 B1 | * | 9/2001 | Alexander | H02H 3/00 700/297 |

FOREIGN PATENT DOCUMENTS

CN    108390352 A    8/2018

OTHER PUBLICATIONS

Z. Radojevic, et al., "Smart Overhead Lines Autoreclosure Algorithm Based on Detailed Fault Analysis," IEEE Transactions on Smart Grid, vol. 4, No. 4, pp. 1829-1838, Dec. 2013.

(Continued)

*Primary Examiner* — Nguyen Tran
(74) *Attorney, Agent, or Firm* — Analects Legal LLC

(57) ABSTRACT

The present disclosure is directed to a single-phase reclosing method, device and storage medium for AC/DC system. The method comprises: acquiring three-phase voltages at inverter-side AC bus close to the transformer, three-phase currents measured at the outlet of inverter-side AC line and three-phase voltages at inverter-side AC bus far from the transformer; calculating the energy calculation value and energy operation value of the fault line; identifying the fault nature of fault line within the maximum time delay, according to the energy calculation value and energy operation value of fault line and an energy criterion of transient/permanent fault; issuing a reclosing control signal based on the fault nature of fault line to realize effective reclosing of the fault line.

11 Claims, 9 Drawing Sheets

(56) References Cited

OTHER PUBLICATIONS

S. Jamali and A. Parham, "New approach to adaptive single pole auto-reclosing of power transmission lines," IET Generation, Transmission & Distribution, vol. 4, No. 1, pp. 115-122, Jan. 2010.
D. Lin, et al., "An Adaptive Reclosure Scheme for Parallel Transmission Lines With Shunt Reactors," IEEE Transactions on Power Delivery, vol. 30, No. 6, pp. 2581-2589, Dec. 2015.
X. N. Lin, et al., "A Dual-Window Transient Energy Ratio-Based Adaptive Single-Phase Reclosure Criterion for EHV Transmission Line," IEEE Transactions on Power Delivery, vol. 22, No. 4, pp. 2080-2086, Oct. 2007.
Z. M. Radojevic and J. R. Shin, "New Digital Algorithm for Adaptive Reclosing Based on the Calculation of the Faulted Phase Voltage Total Harmonic Distortion Factor," IEEE Transactions on Power Delivery, vol. 22, No. 1, pp. 37-41, Jan. 2007.
J. L. Suonan, et al., "A Novel Single-Phase Adaptive Reclosure Scheme for Transmission Lines With Shunt Reactors," IEEE Transactions on Power Delivery, vol. 24, No. 2, pp. 545-551, Apr. 2009.
Z. M. Radojevic and J. R. Shin, "New one terminal digital algorithm for adaptive reclosing and fault distance calculation on transmission lines," IEEE Transactions on Power Delivery, vol. 21, No. 3, pp. 1231-1237, Jul. 2006.
F. D. Zahlay, et al., "A New Intelligent Autoreclosing Scheme Using Artificial Neural Network and Taguchi's Methodology," IEEE Transactions on Industry Applications, vol. 47, No. 1, pp. 306-313, Feb. 2011.
Sang-Pil Ahn, et al., "An Alternative Approach to Adaptive Single-Pole Auto Reclosing in High-Voltage Transmission Systems Based on Variable Dead Time Control," IEEE Transactions on Power Delivery, vol. 16, No. 4, pp. 676-686, Oct. 2001.
M. Khodadadi, et al., "A Noncommunication Adaptive Single-Pole Auto reclosure Scheme Based on the ACUSUM Algorithm," IEEE Transactions on Power Delivery, vol. 28, No. 4, pp. 2526-2533, Oct. 2013.
X. H. Luo, et al., "Improved digital algorithm for adaptive reclosing for transmission lines with shunt reactors," IET Generation, Transmission & Distribution, vol. 10, No. 9, pp. 2066-2070, Jun. 2016.
D.S. Fitton, et al., "Design and implementation of an adaptive single pole autoreclosure technique for transmission lines using artificial neural networks," IEEE Transactions on Power Delivery, vol. 11, No. 2, pp. 748-756, Apr. 1996.
M.B. Djuric and V.V. Terzija, "A new approach to the arcing faults detection for fast autoreclosure in transmission systems," IEEE Transactions on Power Delivery, vol. 10, No. 4, pp. 1793-1798, Oct. 1995.
X. N. Lin, et al., "A novel adaptive single-phase reclosure scheme using dual-window transient energy ratio and mathematical morphology," IEEE Transactions on Power Delivery, vol. 21, No. 4, pp. 1871-1877, Oct. 2006.
I.M. Dudurych, et al., "Arc effect on single-phase reclosing time of a UHV power transmission line," IEEE Transactions on Power Delivery, vol. 19, No. 2, pp. 854-860, Apr. 2004.
F. D. Leon and J. Cohen, "AC Power Theory From Poynting Theorem: Accurate Identification of Instantaneous Power Components in Nonlinear-Switched Circuits," IEEE Transactions on Power Delivery, vol. 25, No. 4, pp. 2104-2112, Oct. 2010.

\* cited by examiner

SINGLE-PHASE RECLOSING METHOD, DEVICE AND STORAGE MEDIUM FOR AC/DC SYSTEM

CROSS-REFERENCE TO RELATED APPLICATIONS

This application claims priority to Chinese Patent Application No. 202010680755.6, filed on Jul. 15, 2020, which is hereby incorporated by reference in its entirety.

TECHNICAL FIELD

The present disclosure is directed to a relay protection technique, more specifically a single-phase reclosing method, device and storage medium for AC/DC system.

BACKGROUND

In AC/DC system, when single-phase grounding fault occurs on inverter-side AC line and is cleared by protection, due to the supporting effect of receiving-end system voltage, commutation failure in DC system may recover automatically, and the fault line may remain in open-phase operation state. Single-phase reclosing technique is widely applied in power system above 220 kV due to its low cost, simple principle and reliable operation.

Existing single-phase reclosing methods cannot correctly distinguish between transient and permanent faults, and circuit breakers will inevitably be reclosed to permanent fault. If AC line is automatically reclosed to permanent fault, commutation failure will once again be caused in DC system. Such successive impacts will greatly endanger the safety of HVDC (High Voltage Direct Current) devices. Besides, sharp fluctuations in active and reactive power will cause system operational stability to further deteriorate. If DC system detects two commutation failures within 400 ms, DC protection will be blocked, which may even cause cascading fault in AC/DC system, resulting in huge economic loss.

SUMMARY

In view of the above analysis, this disclosure aims to provide a single-phase reclosing method and system for AC/DC system, to overcome the difficulty of existing single-phase reclosing methods in distinguishing between transient and permanent faults which results in low safety and stability of AC/DC system.

On the one hand, this disclosure provides a single-phase reclosing method for AC/DC system, which includes the following steps:

acquiring three-phase voltages at inverter-side AC bus close to the transformer $u_{am}$, $u_{bm}$, $u_{cm}$, three-phase currents measured at the outlet of inverter-side AC line $i_a$, $i_b$, $i_c$, and three-phase voltages at inverter-side AC bus far from the transformer $u_{an}$, $u_{bn}$, $u_{cn}$;

calculating energy calculation value $E_{cal}$ and energy operation value $E_{DZ}$ of the fault line, based on the acquired three-phase voltages at inverter-side AC bus close to the transformer $u_{am}$, $u_{bm}$, $u_{cm}$, three-phase currents measured at the outlet of inverter-side AC line $i_a$, $i_b$, $i_c$, and three-phase voltages at inverter-side AC bus far from the transformer $u_{an}$, $u_{bn}$, $u_{cn}$;

identifying the fault nature of fault line within the maximum time delay, according to energy calculation value $E_{cal}$ and energy operation value $E_{DZ}$ of the fault line and the energy criterion of transient/permanent fault;

issuing a reclosing control signal based on the fault nature of the fault line to realize effective reclosing of the fault line.

Further, the formula of energy calculation value $E_{cal}$ is:

$$E_{cal} = \int_{t_1}^{t_2} \left[ \left( i_{jm}\left(t - \frac{T}{4}\right) \cdot u_{jm}(t) - i_{jn}\left(t - \frac{T}{4}\right) \cdot u_{jn}(t) \right) - i_{jn}\left(t - \frac{T}{4}\right) \cdot (u_{jm}(t) - u_{jn}(t)) \right] dt$$

where $$i_{jm} = \frac{C_m}{2} \cdot \frac{d\left(\frac{u_{xm}(t) + u_{ym}(t) -}{2u_{jm}(t)}\right)}{dt} - \frac{C_s}{2} \cdot \frac{du_{jm}(t)}{dt}$$

$$i_{jn}(t) = \frac{C_s}{2} \cdot \frac{du_{jn}(t)}{dt} + \frac{C_m}{2} \cdot \frac{d\left(\frac{2u_{jn}(t) -}{u_{xn}(t) - u_{yn}(t)}\right)}{dt}$$

where $E_{cal}^-$ is energy calculation value. $t_1$ is the start time of integration data window, $t_2$ is the end time of integration data window, t is a certain point in the integration data window, and T is power-frequency period. j represents the phase of the fault line, which is a, b or c. x and y represent the other two phases. $i_{jm}$ is j-phase current at inverter-side AC bus close to the transformer; $i_{jn}$ is j-phase current at inverter-side AC bus far from the transformer. $u_{jm}$ is j-phase voltage at inverter-side AC bus close to the transformer; $u_{xm}$ is x-phase voltage at inverter-side AC bus close to the transformer; $u_{ym}$ is y-phase voltage at inverter-side AC bus close to the transformer. $u_{jn}$ is j-phase voltage at inverter-side AC bus far from the transformer; $u_{xn}$ is x-phase voltage at inverter-side AC bus far from the transformer; $u_{yn}$ is y-phase voltage at inverter-side AC bus far from the transformer. $C_m$ is the mutual capacitance between AC lines, $C_s$ is AC line-to-ground capacitance.

Further, the formula of energy operation value $E_{DZ}$ is:

$$E_{DZ} = \int_{t_1}^{t_2} \left( i_{jm}\left(t - \frac{T}{4}\right) - i_{jn}\left(t - \frac{T}{4}\right) \right) * \Delta u_m(t) dt$$

$$\Delta u_m(t) = \rho \left( R_s i_{jm}(t) + R_m(i_{xm}(t) + i_{ym}(t)) + L_s \cdot \frac{di_{jm}(t)}{dt} + L_m \cdot \frac{d(i_{xm}(t) + i_{ym}(t))}{dt} \right)$$

where $$i_{xm}(t) = i_x(t) + \frac{C_m}{2} \cdot \frac{d\left(\frac{u_{jm}(t) + u_{ym}(t) -}{2u_{xm}(t)}\right)}{dt} - \frac{C_s}{2} \cdot \frac{du_{xm}(t)}{dt}$$

$$i_{ym}(t) = i_y(t) + \frac{C_m}{2} \cdot \frac{d\left(\frac{u_{jm}(t) + u_{xm}(t) -}{2u_{ym}(t)}\right)}{dt} - \frac{C_s}{2} \cdot \frac{du_{ym}(t)}{dt}$$

where $E_{DZ}$ is energy operation value. $\Delta u_m$ is the voltage drop from the relaying point at inverter-side AC bus to the fault point on fault line. $i_{xm}$ is x-phase line current at inverter-side AC bus close to the transformer; $i_{ym}$ is y-phase line current at inverter-side AC bus close to the transformer. $i_x$ is the current measured at the outlet of x-phase line at inverter-side AC bus close to the transformer; $i_y$ is the current measured at the outlet of y-phase line at inverter-side AC bus close to the transformer. $\rho$ is the distance between the fault point and the relaying point at inverter-side AC bus.

$R_s$ is the self resistance of AC line, $R_m$ is the mutual resistance between different phases of AC line, $L_s$ is the self inductance of AC line, and $L_m$ is the mutual inductance between different phases of AC line.

Further, the formula of energy criterion of transient/permanent fault is:

$$|E_{cal} - E_{DZ}| < E_{set}$$

where $E_{set}$ is energy threshold value.

Further, based on energy calculation value $E_{cal}$ and energy operation value $E_{DZ}$ of the fault line and the energy criterion of transient/permanent fault, identifying the fault nature of fault line within the maximum time delay comprises:

if energy calculation value $E_{cal}$ and energy operation value $E_{DZ}$ of the fault line satisfy the energy criterion, identifying the fault nature as transient fault, thus the reclosing device issues a reclosing demand to circuit breakers on two ends of the fault line to close the circuit breakers;

if energy calculation value $E_{cal}$ and energy operation value $E_{DZ}$ of the fault line do not satisfy the energy criterion, identifying the fault nature as permanent fault, thus the reclosing device is blocked.

On the other hand, this disclosure provides a single-phase reclosing device for AC/DC system, which includes the following components:

a first processor of data acquisition, configured to acquire three-phase voltages at inverter-side AC bus close to the transformer $u_{am}$, $u_{bm}$, $u_{cm}$, three-phase currents measured at the outlet of inverter-side AC line $i_a$, $i_b$, $i_c$, and three-phase voltages at inverter-side AC bus far from the transformer $u_{an}$, $u_{bn}$, $u_{cn}$;

a second processor of energy calculation, configured to calculate energy calculation value $E_{cal}$ and energy operation value $E_{DZ}$ of the fault line according to the acquired three-phase voltages at inverter-side AC bus close to the transformer $u_{am}$, $u_{bm}$, $u_{cm}$, three-phase currents measured at the outlet of inverter-side AC line $i_a$, $i_b$, $i_c$, and three-phase voltages at inverter-side AC bus far from the transformer $u_{an}$, $u_{bn}$, $u_{cn}$;

a third processor of fault nature identification, configured to identify the fault nature of fault line within the maximum time delay according to energy calculation value $E_{cal}$ and energy operation value $E_{DZ}$ of the fault line and an energy criterion of transient/permanent fault;

a fourth processor of reclosing operation, configured to issue reclosing control signal according to the fault nature of fault line and realize effective reclosing of the fault line.

Further, the second processor of energy calculation is configured to calculate energy calculation value $E_{cal}$ according to the following formula:

$$E_{cal} = \int_{t_1}^{t_2} \left[ \left( i_{jm}\left(t - \frac{T}{4}\right) \cdot u_{jm}(t) - i_{jn}\left(t - \frac{T}{4}\right) \cdot u_{jn}(t) \right) - i_{jn}\left(t - \frac{T}{4}\right) \cdot (u_{jm}(t) - u_{jn}(t)) \right] dt$$

where $$i_{jm} = \frac{C_m}{2} \cdot \frac{d(u_{xm}(t) + u_{ym}(t) - 2u(t))}{dt} - \frac{C_s}{2} \cdot \frac{du_{jm}(t)}{dt}$$

$$i_{jn} = \frac{C_s}{2} \cdot \frac{du_{jn}(t)}{dt} + \frac{C_m}{2} \cdot \frac{d(2u_{jn}(t) - u_{xn}(t) - u_{yn}(t))}{dt}$$

where $E_{cal}$ is energy calculation value. $t_1$ is the start time of integration data window, $t_2$ is the end time of integration data window, t is a certain point in the integration data window, and T is power-frequency period. j represents the phase of the fault line, which is a, b or c. x and y represent the other two phases. $i_{jm}$ is j-phase current at inverter-side AC bus close to the transformer; $i_{jn}$ is j-phase current at inverter-side AC bus far from the transformer. $u_{jm}$ is j-phase voltage at inverter-side AC bus close to the transformer; $u_{xm}$ is x-phase voltage at inverter-side AC bus close to the transformer; $u_{ym}$ is y-phase voltage at inverter-side AC bus close to the transformer. $u_{jn}$ is j-phase voltage at inverter-side AC bus far from the transformer; $u_{xn}$ is x-phase voltage at inverter-side AC bus far from the transformer; $u_{yn}$ is y-phase voltage at inverter-side AC bus far from the transformer. $C_m$ is the mutual capacitance between AC lines, $C_s$ is AC line-to-ground capacitance.

Further, the second processor of energy calculation is configured to calculate energy operation value $E_{DZ}$ according to the following formula:

$$E_{DZ} = \int_{t_1}^{t_2} \left( i_{jm}\left(t - \frac{T}{4}\right) - i_{jn}\left(t - \frac{T}{4}\right) \right) \cdot \Delta u_m(t) dt$$

$$\Delta u_m(t) = \rho \left( R_s i_{jm}(t) + R_m(i_{xm}(t) + i_{ym}(t)) + L_s \cdot \frac{di_{jm}(t)}{dt} + L_s \cdot \frac{d(i_{xm}(t) + i_{ym}(t))}{dt} \right)$$

where $$i_{xm}(t) = i_x(t) + \frac{C_m}{2} \cdot \frac{d\left(u_{jm}(t) + u_{ym}(t) - 2u_{xm}(t)\right)}{dt} - \frac{C_s}{2} \cdot \frac{du_{xm}(t)}{dt}$$

$$i_{ym}(t) = i_y(t) + \frac{C_m}{2} \cdot \frac{d\left(u_{jm}(t) + u_{xm}(t) - 2u_{ym}(t)\right)}{dt} - \frac{C_s}{2} \cdot \frac{du_{ym}(t)}{dt}$$

where $E_{DZ}$ is energy operation value. $\Delta u_m$ is the voltage drop from the relaying point at inverter-side AC bus to the fault point on fault line. $i_{xm}$ is x-phase line current at inverter-side AC bus close to the transformer; $i_{ym}$ is y-phase line current at inverter-side AC bus close to the transformer. $i_x$ is the current measured at the outlet of x-phase line at inverter-side AC bus close to the transformer; $i_y$ is the current measured at the outlet of y-phase line at inverter-side AC bus close to the transformer. $\rho$ is the distance between the fault point and the relaying point at inverter-side AC bus. $R_s$ is the self resistance of AC line, $R_m$ is the mutual resistance between different phases of AC line, $L_s$ is the self inductance of AC line, and $L_m$ is the mutual inductance between different phases of AC line.

Further, the third processor of fault nature identification is configured to obtain the energy-criterion of transient/permanent fault from the following formula:

$$|E_{cal} - E_{DZ}| < E_{set}$$

where $E_{set}$ is energy threshold value.

Further, the third processor of fault nature identification is configured to identify the fault nature of fault line as transient fault when energy calculation value $E_{cal}$ and energy operation value $E_{DZ}$ of the fault line satisfy the energy criterion, and the fourth processor of reclosing operation is configured to issue reclosing demand to circuit breakers on two ends of the fault line to close the circuit breakers;

the third processor of fault nature identification is configured to identify the fault nature of fault line as permanent fault when energy calculation value $E_{cal}$ and energy operation value $E_{DZ}$ of the fault line do not satisfy the energy criterion, and the fourth processor of reclosing operation is configured to block the reclosing device.

This disclosure further provides a storage medium encoded with a set of machine-executable instructions to perform a single-phase reclosing method for AC/DC system, the method comprising:

acquiring three-phase voltages at inverter-side AC bus close to the transformer $u_{am}$, $u_{bm}$, $u_{cm}$, three-phase currents measured at the outlet of inverter-side AC line $i_a$, $i_b$, $i_c$, and three-phase voltages at inverter-side AC bus far from the transformer $u_{an}$, $u_{bn}$, $u_{cn}$;

calculating energy calculation value $E_{cal}$ and energy operation value $E_{DZ}$ of the fault line, based on the acquired three-phase voltages at inverter-side AC bus close to the transformer $u_{am}$, $u_{bm}$, $u_{cm}$, three-phase currents measured at the outlet of inverter-side AC line $i_a$, $i_b$, $i_c$, and three-phase voltages at inverter-side AC bus far from the transformer $u_{an}$, $u_{bn}$, $u_{cn}$;

identifying the fault nature of fault line within the maximum time delay, according to energy calculation value $E_{cal}$ and energy operation value $E_{DZ}$ of the fault line and the energy criterion of transient/permanent fault;

issuing a reclosing control signal based on the fault nature of the fault line to realize effective reclosing of the fault line.

Compared with existing techniques, this disclosure has at least one of the following beneficial achievements:

1 A single-phase reclosing method for AC/DC system. By acquiring the information of voltage and current at both ends of AC line on inverter side, calculating the energy calculation value and energy operation value of fault line according to the acquired voltage and current information. Then, identifying the fault nature of fault line according to the energy criterion of transient/permanent fault. Thus, based on the identified fault nature, issuing corresponding signal to relevant circuit breakers to realize effective reclosing of the fault line. This method overcomes the difficulty of existing single-phase reclosing methods in distinguishing between transient and permanent faults and improves the stability and safety of AC/DC system.

2 Calculating the energy operation value and energy calculation value is provides the foundation and support for the identification of fault nature of single-phase line. The calculation is simple and easy to implement, thus the efficiency of fault nature identification is improved, which is of great significance.

3 By constructing the energy criterion of transient/permanent fault, identifying the fault nature of fault line. After the fault nature of fault line is obtained, issuing reclosing signal corresponding to the fault nature to circuit breakers on two ends of the fault line, to realize effective reclosing of the fault line. This method is simple and easy to implement, and can improve the stability and reliability of AC/DC system.

4 The first processor of data acquisition is configured to acquire the information of voltage and current at inverter-side AC buses. The second processor of energy calculation is configured to calculate the energy calculation value and energy operation value of fault line according to the acquired voltage and current information. Then, the third processor of fault nature identification is configured to identify the fault nature of fault line according to the energy criterion of transient/permanent fault. Finally, based on the identified fault nature, the fourth processor of reclosing operation is configured to issue corresponding signal to relevant circuit breakers and realize effective reclosing of the fault line. Cooperation between these four processors overcomes the difficulty of existing single-phase reclosing system in distinguishing between transient and permanent faults and improves the stability and safety of AC/DC system.

In this disclosure, the above technical schemes can combine with one another to form more preferred combination schemes. Other features and advantages of this disclosure will be illustrated in the following instructions. Some advantages will be more evident and better known in the instructions or embodiments of this disclosure. The purpose and other advantages of this disclosure can be realized and obtained from the instructions and the contents highlighted in the attached figures.

BRIEF DESCRIPTION OF DRAWINGS

The attached figures are only used to present specific embodiments, but are not limitations of this disclosure. In all the attached figures, the same reference symbol represents the same component.

wherein: 100—first processor of data acquisition; 200—second processor of energy calculation; 300—third processor of fault nature identification; 400—fourth processor of reclosing operation.

DESCRIPTION OF EMBODIMENTS

Combining the attached figures, preferred embodiments of this disclosure are described below in detail. The attached figures are part of this disclosure, which are used together with the embodiments of this disclosure to illustrate the principle of this disclosure, but are not used to limit the disclosure scope of this disclosure.

Existing single-phase reclosing methods cannot correctly distinguish between transient and permanent faults. If AC line is reclosed to permanent fault, commutation failure will once again be caused in DC system. Not only the successive impacts will greatly endanger the safety of HVDC devices, but also the sharp fluctuations in active/reactive power will cause system operational stability to further deteriorate. If DC system detects two commutation failures within 400 ms, DC protection will be blocked, which may even cause cascading fault in AC/DC system, resulting in huge economic loss.

In view of this problem, this disclosure proposes a single-phase reclosing method and system for AC/DC system. By acquiring the information of voltage and current at both ends of AC line on inverter side, calculating the energy calculation value and energy operation value of fault line according to the acquired voltage and current information. Then, identifying the fault nature of fault line according to the energy criterion of transient/permanent fault. Thus, based on the identified fault nature, issuing corresponding signal to relevant circuit breakers to realizes effective reclosing of the fault line. This disclosure overcomes the difficulty of existing single-phase reclosing methods in distinguishing between transient and permanent faults and improves the stability and safety of AC/DC system.

Figure 1:
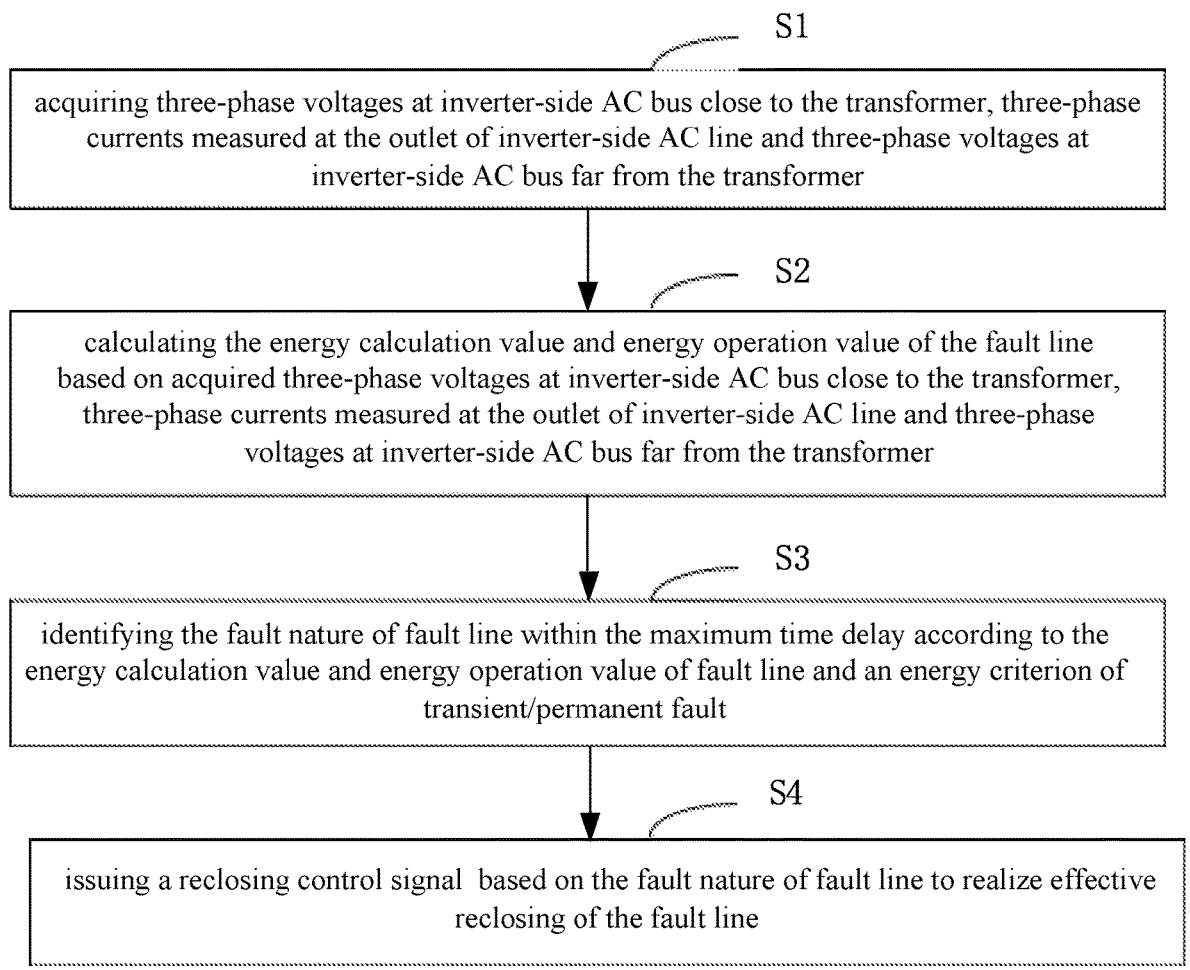
FIG. 1 is the procedure of single-phase reclosing method for AC/DC system.

A specific embodiment of this disclosure discloses a single-phase reclosing method for AC/DC system, as shown in FIG. 1. It contains the following four steps.

Step S1: acquiring three-phase voltages at inverter-side AC bus close to the transformer $u_{am}$, $u_{bm}$, $u_{cm}$, three-phase currents measured at the outlet of inverter-side AC line $i_a$, $i_b$, $i_c$, and three-phase voltages at inverter-side is AC bus far from the transformer $u_{an}$, $u_{bn}$, $u_{cn}$. Specifically, for the AC/DC system shown in FIG. 2, the information to be acquired includes three-phase voltages at inverter-side AC bus close to the transformer $u_{am}$, $u_{bm}$, $u_{cm}$, three-phase currents measured at the outlet of inverter-side AC line $i_a$, $i_b$, $i_c$, and three-phase voltages at inverter-side AC bus far from the transformer $u_{an}$, $u_{bn}$, $u_{cn}$.

Figure 3:
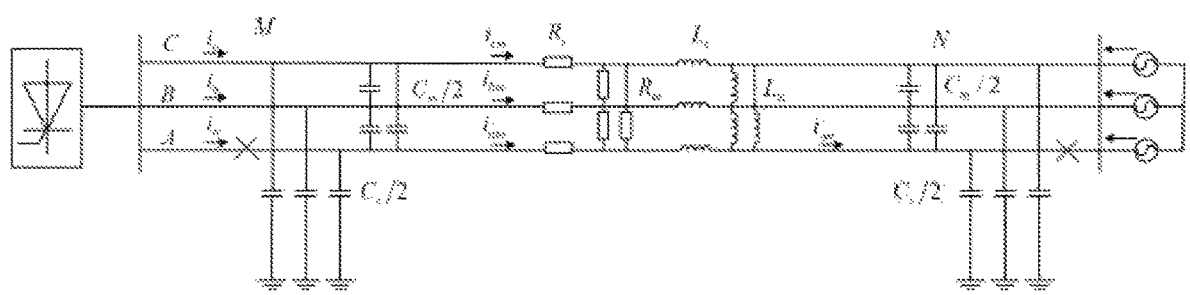
FIG. 3 is the equivalent model of AC line a-phase transient fault.

Step S2: calculating energy calculation value $E_{cal}$ and energy operation value $E_{DZ}$ of the fault line according to the acquired three-phase voltages at inverter-side AC bus close to the transformer $u_{am}$, $u_{bm}$, $u_{cm}$, three-phase currents measured at the outlet of inverter-side AC line $i_a$, $i_b$, $i_c$, and three-phase voltages at inverter-side AC bus far from the transformer $u_{an}$, $u_{bn}$, $u_{cn}$. Specifically, before calculating the energy calculation value and energy operation value of fault line, first deriving the formulas of energy calculation value and energy operation value according to the equivalent models of AC line transient/permanent fault. Then, calculating the energy calculation value and energy operation value according to the acquired voltage and current data. For example, when AC line a-phase fault occurs, the equivalent model of AC line a-phase transient fault is shown in FIG. 3. According to KCL (Kirchhoffs Current Law):

$$i_{am} = i_1 + i_2 - i_3 \quad (1)$$

where $i_1$, $i_2$, $i_3$ represent the coupling currents between b-phase, c-phase and a-phase and the coupling current between a-phase and ground. The expressions of $i_1$, $i_2$, $i_3$ are respectively:

$$i_1 = \frac{C_m}{2} \cdot \frac{d(u_{bm} - u_{am})}{dt}, \quad i_2 = \frac{C_m}{2} \cdot \frac{d(u_{cm} - u_{am})}{dt}, \quad i_3 = \frac{C_s}{2} \cdot \frac{du_{am}}{dt} \quad (2)$$

Applying formula (2) to (1) yields:

$$i_{am}(t) = \frac{C_m}{2} \cdot \frac{d(u_{bm}(t) + u_{cm}(t) - 2u_{am}(t))}{dt} - \frac{C_s}{2} \cdot \frac{du_{am}(t)}{dt} \quad (3)$$

Similarly, according to the current and voltage information acquired in step S1:

$$i_{bm}(t) = i_b(t) + \frac{C_m}{2} \cdot \frac{d\left(\frac{u_{am}(t) + u_{cm}(t) -}{2u_{bm}(t)}\right)}{dt} - \frac{C_s}{2} \cdot \frac{du_{bm}(t)}{dt} \quad (4)$$

$$i_{cm}(t) = i_c(t) + \frac{C_m}{2} \cdot \frac{d\left(\frac{u_{am}(t) + u_{bm}(t) -}{2u_{cm}(t)}\right)}{dt} - \frac{C_s}{2} \cdot \frac{du_{cm}(t)}{dt} \quad (5)$$

$$i_{an}(t) = \frac{C_s}{2} \cdot \frac{du_{an}(t)}{dt} + \frac{C_m}{2} \cdot \frac{d(2u_{an}(t) - u_{cn}(t) - u_{cn}(t))}{dt} \quad (6)$$

Figure 4:
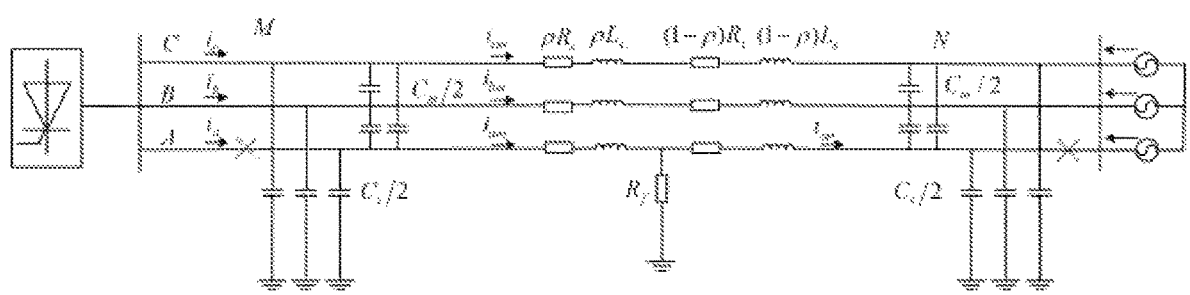
FIG. 4 is the equivalent model of AC line a-phase permanent fault.

The equivalent model of AC line a-phase permanent fault is shown in FIG. 4. In this case, circuit breakers on two ends of a-phase line are open, and the fault still exists. According to KVL (Kirchhoffs Voltage Law), the expression of voltage drop from relaying point to fault point on inverter-side AC line $\Delta u_m$ can be obtained:

$$\Delta u_m(t) = \quad (7)$$
$$\rho\left(R_s i_{am}(t) + R_m(i_{bm}(t) + i_{cm}(t)) + L_s \cdot \frac{di_{am}(t)}{dt} + L_m \cdot \frac{d(i_{bm}(t) + i_{cm}(t))}{dt}\right)$$

After a-phase current at inverter-side AC bus close to the transformer $i_{am}$, a-phase current at inverter-side AC bus far from the transformer $i_{an}$, and the voltage drop from relaying point to fault point on inverter-side AC line $\Delta u_m$ are obtained, calculating the energy calculation value and energy operation value of a-phase fault line according to the following formula:

$$E_{cal} = \int_{t_1}^{t_2} \left[\left(i_{am}\left(t - \frac{T}{4}\right) \cdot u_{anm}(t) - i_{am}\left(t - \frac{T}{4}\right) \cdot u_{an}(t)\right) - \right.$$
$$\left. i_{an}\left(t - \frac{T}{4}\right) \cdot (u_{an}(t) - u_{an}(t))\right] dt$$

$$E_{DZ} = \int_{t_1}^{t_2} \left(i_{am}\left(t - \frac{T}{4}\right) - i_{an}\left(t - \frac{T}{4}\right)\right) \cdot \Delta u_m(t) dt$$

Consider that the energy of input line is mainly reactive power consumed by line inductance and the mutual inductance between lines, the integration of which in one period is 0, such energy criterion is not obvious. Therefore, in the energy calculating formulas, currents apply the values with 90° phase lag when multiplied by voltage, in order that the calculated values mainly reflect the energy consumed by inductances.

Similarly, obtaining the formulas of energy calculation value and energy operation value in the case of AC line b-phase and c-phase faults. Thus, concluding when fault occurs in any phase of AC line, the formulas of energy calculation value and energy operation value as follows.

Preferably, calculating energy calculation value $E_{cal}$ according to the following formula:

$$E_{cal} = \int_{t_1}^{t_2} \left[\left(i_{jm}\left(t - \frac{T}{4}\right) \cdot u_{jm}(t) - i_{jn}\left(t - \frac{T}{4}\right) \cdot u_{jn}(t)\right) - i_{jn}\left(t - \frac{T}{4}\right) \cdot (u_{jm}(t) - u_{jn}(t))\right] dt$$

where $$i_{jm} = \frac{C_m}{2} \cdot \frac{d(u_{xm}(t) + u_{ym}(t) - 2u_{jm}(t))}{dt} - \frac{C_s}{2} \cdot \frac{du_{jm}(t)}{dt}$$

$$i_{jn} = \frac{C_s}{2} \cdot \frac{du_{jn}(t)}{dt} + \frac{C_m}{2} \cdot \frac{d(2u_{jn}(t) - u_{xn}(t) - u_{yn}(t))}{dt}$$

where $E_{cal}$ is energy calculation value. $t_1$ is the start time of integration data window, $t_2$ is the end time of integration data window, t is a certain point in the integration data window, and T is power-frequency period. j represents the phase of the fault line, which is a, b or c. x and y represent the other two phases. $i_{jm}$ is j-phase current at inverter-side AC bus close to the transformer; $i_{jn}$ is j-phase current at inverter-side AC bus far from the transformer. $u_{jm}$ is j-phase voltage at inverter-side AC bus close to the transformer; $u_{xm}$ is x-phase voltage at inverter-side AC bus close to the transformer; $u_{ym}$ is y-phase voltage at inverter-side AC bus close to the transformer. $u_{jn}$ is j-phase voltage at inverter-side AC bus far from the transformer; $u_{xn}$ is x-phase voltage at inverter-side AC bus far from the transformer; $u_{yn}$ is y-phase voltage at inverter-side AC bus far from the transforme. $C_m$ is the mutual capacitance between AC lines, $C_s$ is AC line-to-ground capacitance.

Preferably, calculating energy operation value $E_{DZ}$ according to the following formula:

$$E_{DZ} = \int_{t_1}^{t_2} \left( i_{jm}\left(t - \frac{T}{4}\right) - i_{jn}\left(t - \frac{T}{4}\right) \right) \cdot \Delta u_m(t) dt$$

$$\Delta u_m(t) =$$

$$\rho \left( R_s i_{jm}(t) + R_m(i_{xm}(t) + i_{ym}(t)) + L_s \cdot \frac{di_{jm}(t)}{dt} + L_m \cdot \frac{d(i_{xm}(t) + i_{ym}(t))}{dt} \right)$$

where $$i_{xm}(t) = i_x(t) + \frac{C_m}{2} \cdot \frac{d\left(\frac{u_{jm}(t) + u_{ym}(t) -}{2u_{xm}(t)}\right)}{dt} - \frac{C_s}{2} \cdot \frac{du_{xm}(t)}{dt}$$

$$i_{ym}(t) = i_y(t) + \frac{C_m}{2} \cdot \frac{d\left(\frac{u_{jm}(t) + u_{xm}(t) -}{2u_{ym}(t)}\right)}{dt} - \frac{C_s}{2} \cdot \frac{du_{ym}(t)}{dt}$$

where $E_{DZ}$ is energy operation value. $\Delta u_m$ is the voltage drop from the relaying point at inverter-side AC bus to the fault point on fault line. $i_{xm}$ is x-phase line current at inverter-side AC bus close to the transformer; $i_{ym}$ is y-phase line current at inverter-side AC bus close to the transformer. $i_x$ is the current measured at the outlet of x-phase line at inverter-side AC bus close to the transformer; $i_y$ is the current measured at the outlet of y-phase line at inverter-side AC bus close to the transformer. $\beta$ is the distance between the fault point and the relaying point at inverter-side AC bus. $R_s$ is the self resistance of AC line, $R_m$ is the mutual resistance between different phases of AC line, $L_s$ is the self inductance of AC line, and $L_m$ is the mutual inductance between different phases of AC line.

Calculating the energy operation value and energy calculation value provides the foundation and support for the identification of fault nature of single-phase line. The calculation is simple and easy to implement, thus the efficiency of fault nature identification is improved, which is of great significance.

Step S3: identifying the fault nature of fault line within the maximum time delay according to energy calculation value $E_{cal}$ and energy operation value $E_{DZ}$ of the fault line and an energy criterion of transient/permanent fault. Specifically, first constructing the energy criterion of transient/permanent fault. If the energy operation value and energy calculation value obtained in step 2 satisfy the energy criterion of transient/permanent fault, identifying the fault nature as transient fault. If the energy operation value and energy calculation value do not satisfy the energy criterion of transient/permanent fault within the maximum time delay, identifying the fault nature as permanent fault.

Preferably, obtaining the energy criterion of transient/permanent fault from the following formula:

$$|E_{cal} - E_{DZ}| < E_{set}$$

where $E_{set}$ is energy threshold value.

Specifically, in the case of transient fault, $|E_{cal}(t) - E_{DZ}(t)|$ is theoretically 0; in the case of permanent fault, $|E_{cal}(t) - E_{DZ}(t)|$ is relatively large. Set the energy threshold value to hide from the calculation error, thus set the energy threshold value as a fixed value according to the details of power system and the computing capability of system backstage. In the subsequent embodiments of this disclosure, energy threshold value $E_{set}$ is set to be 10 KJ.

Step S4: issuing reclosing control signal according to the fault nature of fault line and realize effective reclosing of the fault line. Preferably, after identified the fault nature of fault line within the maximum time delay according to energy calculation value $E_{cal}$ and energy operation value $E_{DZ}$ of the fault line and the energy criterion of transient/permanent fault, issuing reclosing control signal according to the fault nature of fault line comprises: if energy calculation value $E_{cal}$ and energy operation value $E_{DZ}$ of the fault line satisfy the energy criterion, it is identified as transient fault in step S3, issuing reclosing demand to circuit breakers on two ends of the fault line to close the circuit breakers; if energy calculation value $E_{cal}$ and energy operation value $E_{DZ}$ of the fault line do not satisfy the energy criterion, it is identified as permanent fault in step S3, blocking the reclosing device.

The reclosing device is installed in the relay protection room of transformer substation, and circuit breakers are set at the outlets of fault line MN. The reclosing device can issue corresponding control signal to the circuit breakers according to the fault nature of fault line, so that the circuit breakers can execute corresponding operation to realize protection of the fault line. The state of circuit breakers includes blocking state and un-blocking state. In un-blocking state, the circuit breakers can be closed or opened. In this embodiment, when transient fault occurs, the reclosing device issues reclosing demand to circuit breakers on two ends of inverter-side AC line, so that the circuit breakers are closed and normal power supply is restored to the fault line. When permanent fault occurs, the reclosing device is blocked, and the fault line is no more switched on to ensure the safety of maintenance.

Specifically, if the energy calculation value and energy operation value satisfy the energy criterion, identifying the fault nature as transient fault. If the energy operation value and energy calculation value of fault line do not satisfy the energy criterion within the maximum time delay, identifying the fault nature as permanent fault. In the case of transient fault, the reclosing device issues reclosing demand to circuit breakers on two ends of inverter-side AC line and the circuit breakers are closed. In the case of permanent fault, the reclosing device is blocked. The maximum time delay is set according to the maximum open-phase operation time allowed by the system.

By constructing the energy criterion of transient/permanent fault to identify the fault nature of fault line, the reclosing device can issue corresponding reclosing signal to circuit breakers on two ends of inverter-side AC line according to the identified fault nature and realize effective reclosing of the fault line. This method is simple and easy to implement. Being capable of fast fault nature identification, this method makes for timely protection of the fault line and improves the stability and reliability of AC/DC system.

Compared with existing techniques, this embodiment provides a single-phase reclosing method for AC/DC system, which acquiring the information of voltage and current at inverter-side AC buses and calculating the energy calculation value and energy operation value of fault line according to the acquired voltage and current information. Then, identifying the fault nature of fault line according to the energy criterion of transient/permanent fault. Thus, based on the identified fault nature, issuing corresponding signal to relevant circuit breakers to realize protection of the fault line. This method overcomes the difficulty of existing single-phase reclosing methods in distinguishing between transient and permanent faults and improves the stability and safety of AC/DC system.

Figure 2:
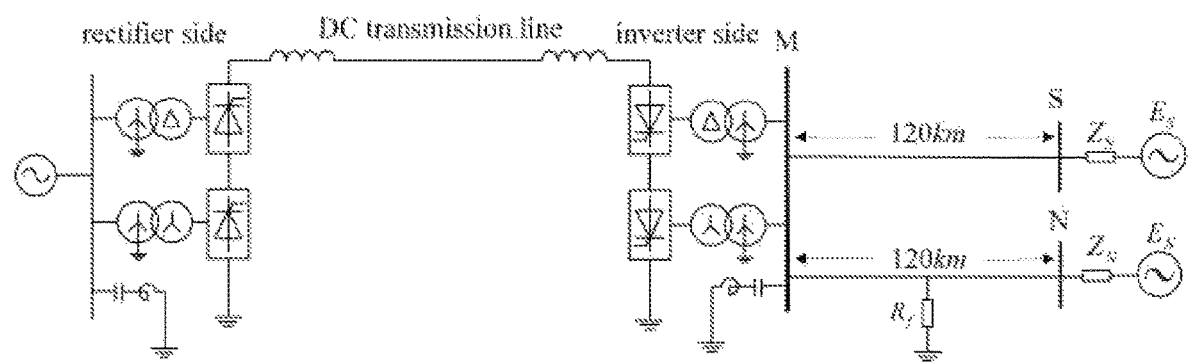
FIG. 2 is AC/DC simulation system.

The AC/DC simulation system built for this embodiment is shown in FIG. 2, where the DC part is ±500 kV DC transmission system, and inverter-side AC bus voltage is 230 kV. Inverter-side AC bus is connected with AC transmission lines MN and MS, where line MN is set as the fault line. Line MN and line MS are both 120 km in length with the following parameters: $r_1=0.1834*10^{-4}$ Ω/m, $x_1=0.263*10^{-3}$ Ω/m, $c_1=500$MΩ*m; $r_0=0.1417*10^{-3}$ Ω/km, $x_0=0.6027*10^{-3}$ Ω/km, $C_0=800$MΩ*m. The positive-sequence and zero-sequence impedances of system S are respectively $Z_{R1}=4.477+j59.913$Ω and $Z_{R0}=2.0+j6.37$Ω. The sampling frequency is 2 kHz.

Figure 5:
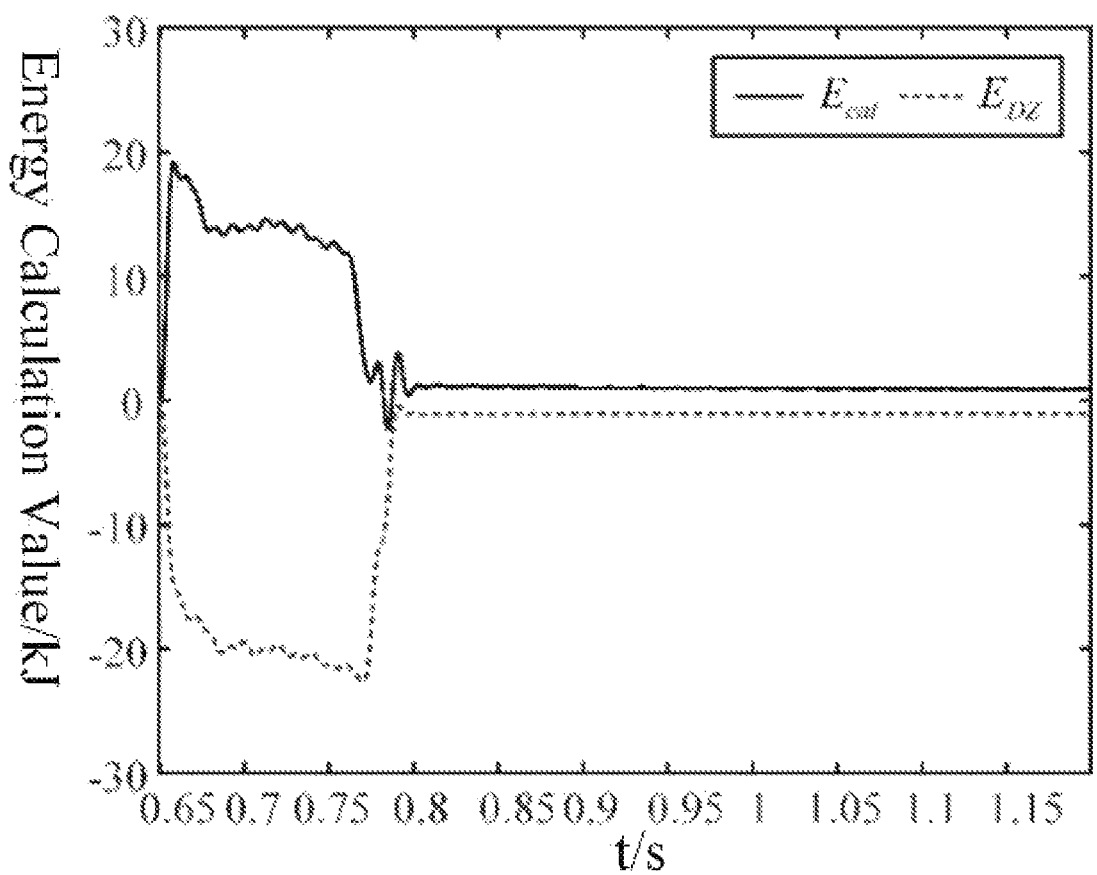
FIG. 5 is energy calculating result of transient fault.

Set a-phase transient/permanent grounding fault at the midpoint of line MN at t=0.5 s with the fault resistance being 50Ω and clear the fault at t=0.6 s. In the case of transient fault, the energy calculating result of input fault line is shown in FIG. 5, where the solid line represents energy calculation value $E_{cal}$ and the dashed line represents energy operation value $E_{DZ}$. It can be seen from FIG. 5 that, when the fault lasts, energy calculation value $E_{cal}$ is larger than energy operation value $E_{DZ}$; after the fault disappears, both the energy calculation value and energy operation value are next to 0.

Figure 6:
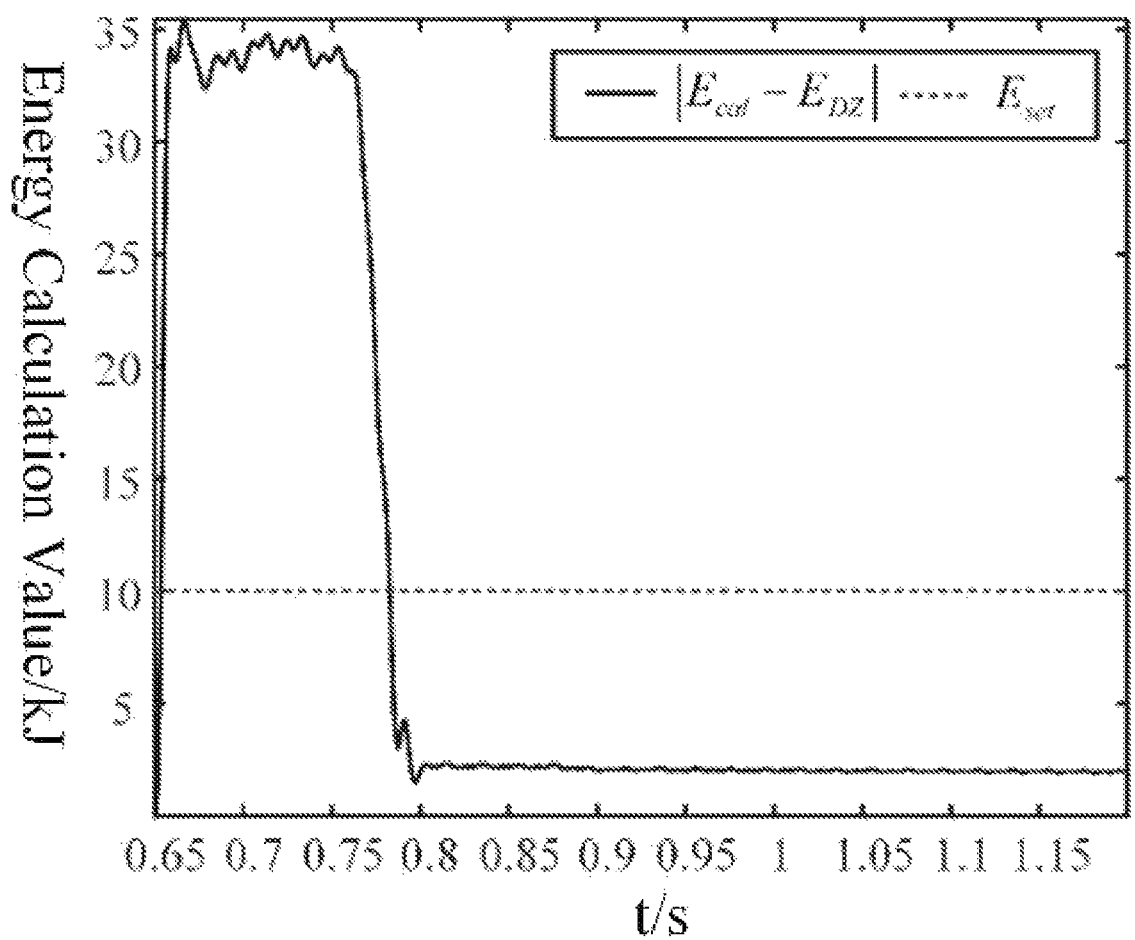
FIG. 6 is the identification result of transient fault.

The identification result of transient fault is shown in FIG. 6, where the solid line represents the absolute value of difference between energy calculation value and energy operation value $|E_{cal}(t)-E_{DZ}(t)|$; the dashed line represents energy threshold value $E_{set}$, which is set to be 10 KJ in this disclosure. It can be seen from FIG. 6 that, when the fault point arc extinguishes at t=0.75 s, $|E_{cal}(t)-E_{DZ}(t)|$ rapidly turns below $E_{set}$, thus identifying the fault nature as transient fault with extinct fault arc, and issuing reclosing demand to close the circuit breakers. This simulation result is consistent with theoretical derivation.

Figure 7:
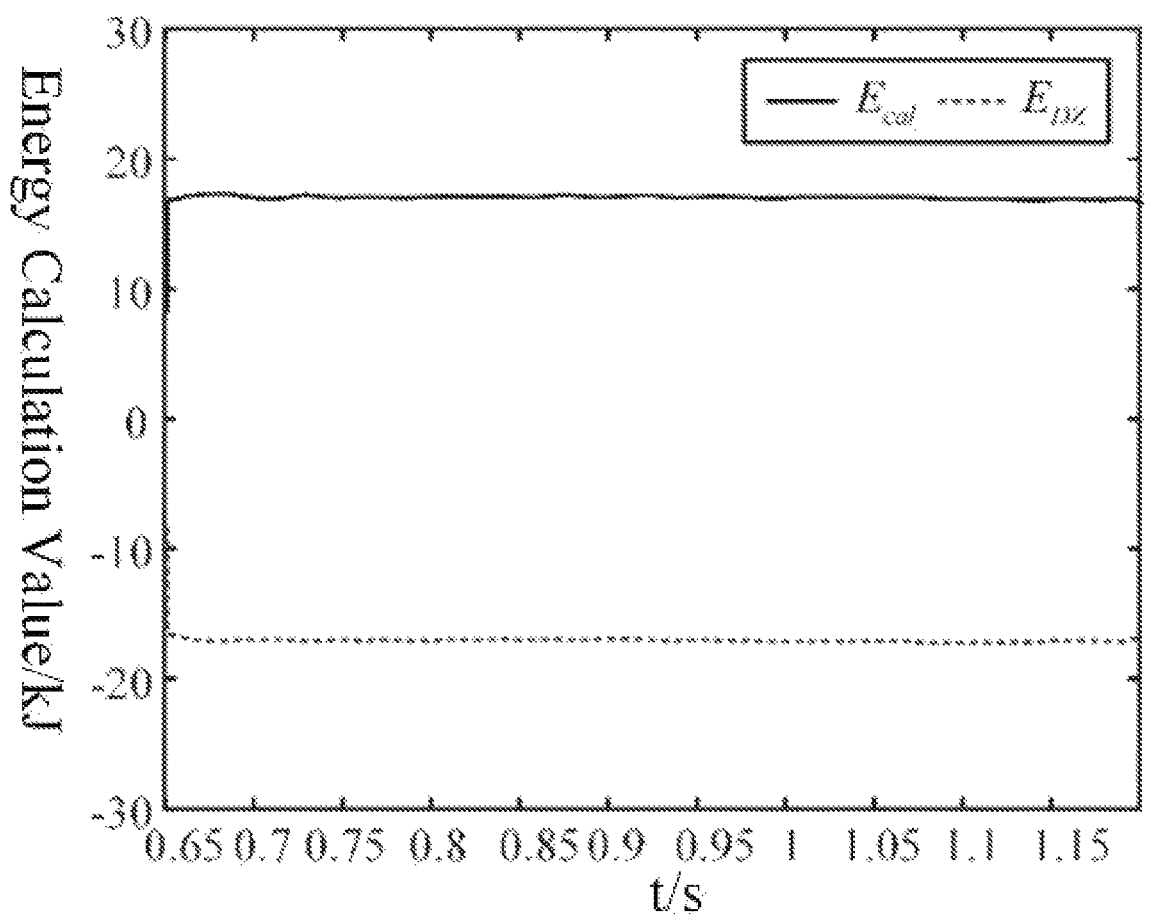
FIG. 7 is energy calculating result of permanent fault.

When a-phase permanent grounding fault occurs, the waveforms of energy calculation value and energy operation value of input fault line are shown in FIG. 7, where the solid line represents energy calculation value $E_{cal}$ and the dashed line represents energy operation value $E_{DZ}$. It can be seen that, the difference between $E_{cal}$ and $E_{DZ}$ remains relatively big.

Figure 8:
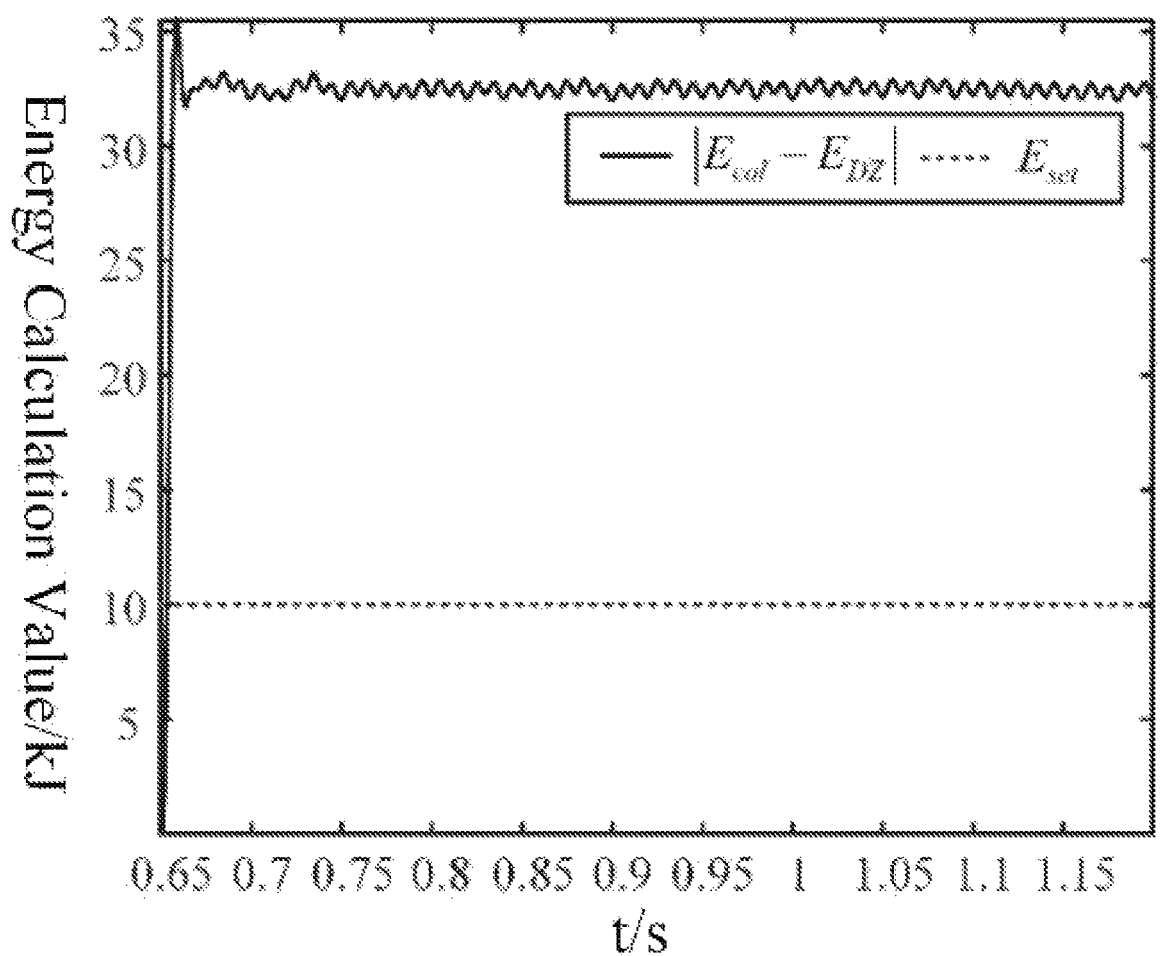
FIG. 8 is the identification result of permanent fault.

The fault nature identification result of a-phase permanent grounding fault is shown in FIG. 8, where the solid line represents the absolute value of energy difference $|E_{cal}(t)-E_{DZ}(t)|$; the dashed line represents energy threshold value $E_{set}$. It can be seen that, $|E_{cal}(t)-E_{DZ}(t)|$ remains above $E_{set}$, thus identifying the fault nature as permanent fault. In this case, reclosing demand will not be issued, issuing the blocking demand to block the reclosing device after the maximum time delay.

Figure 9:
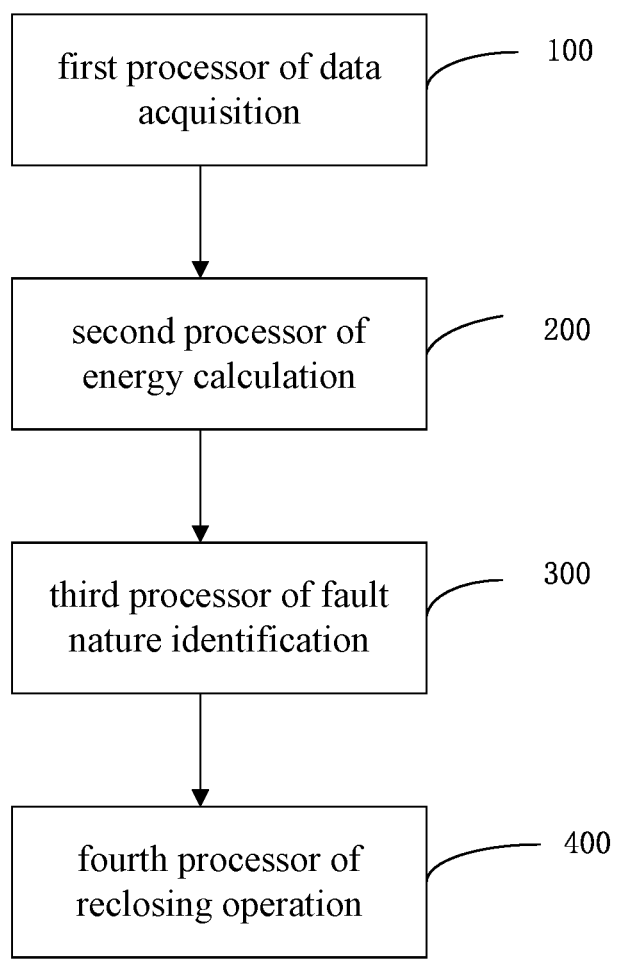
FIG. 9 is the structure of single-phase reclosing system for AC/DC system.

Another embodiment of this application discloses a single-phase reclosing device for AC/DC system, as shown in FIG. 9. It includes four processors. A first processor of data acquisition 100 is configured to acquire three-phase voltages at inverter-side AC bus close to the transformer $u_{am}$, $u_{bm}$, $u_{cm}$, three-phase currents measured at the outlet of inverter-side AC line $i_a$, $i_b$, $i_c$, and three-phase voltages at inverter-side AC bus far from the transformer $u_{an}$, $u_{bn}$, $u_{cn}$. A second processor of energy calculation 200 is configured to calculate energy calculation value $E_{cal}$ and energy operation value $E_{DZ}$ of the fault line according to the acquired three-phase voltages at inverter-side AC bus close to the transformer $u_{am}$, $u_{bm}$, $u_{cm}$, three-phase currents measured at the outlet of inverter-side AC line $i_a$, $i_b$, $i_c$, and three-phase voltages at inverter-side AC bus far from the transformer $u_{an}$, $u_{bn}$, $u_{cn}$. A third processor of fault nature identification 300 is configured to identify the fault nature of fault line within the maximum time delay according to energy calculation value $E_{cal}$ and energy operation value $E_{DZ}$ of the fault line and the energy criterion of transient/permanent fault. A fourth processor of reclosing operation 400 is configured to issue reclosing control signal according to the fault nature of fault line and realizes effective reclosing of the fault line.

The first processor of data acquisition is. configured to acquire the information of voltage and current at inverter-side AC buses. The second processor of energy calculation is configured to calculate the energy calculation value and energy operation value of fault line according to the acquired voltage and current information. Then, the third processor of fault nature identification is configured to identify the fault nature of fault line according to the energy criterion of transient/permanent fault. Finally, based on the identified fault nature, the fourth processor of reclosing operation is configured to issue corresponding signal to relevant circuit breakers and realize effective reclosing of the fault line. Cooperation between these four processors overcomes the difficulty of existing single-phase reclosing system in distinguishing between transient and permanent faults and improves the stability and safety of AC/DC system.

Preferably, the second processor of energy calculation is configured to calculate energy calculation value $E_{cal}$ according to the following formula:

$$E_{cal} = \int_{t_1}^{t_2} \left[ \left(i_{jm}\left(t-\frac{T}{4}\right)\cdot u_{jm}(t) - i_{jn}\left(t-\frac{T}{4}\right)\cdot u_{jn}(t)\right) - i_{jn}\left(t-\frac{T}{4}\right)\cdot (u_{jm}(t) - u_{jn}(t)) \right] dt$$

where $$i_{jm} = \frac{C_m}{2}\cdot\frac{d(u_{xm}(t)+u_{ym}(t)-2u_{jm}(t))}{dt} - \frac{C_s}{2}\cdot\frac{du_{jm}(t)}{dt}$$

$$i_{jn} = \frac{C_s}{2}\cdot\frac{du_{jn}(t)}{dt} + \frac{C_m}{2}\cdot\frac{d(2u_{jn}(t)-u_{xn}(t)-u_{yn}(t))}{dt}$$

where $E_{cal}$ is energy calculation value. $t_1$ is the start time of integration data window, $t_2$ is the end time of integration data window, t is a certain point in the integration data window, and T is power-frequency period. j represents the phase of the fault line, which is a, b or c. x and y represent the other two phases. $i_{jm}$ is j-phase current at inverter-side AC bus close to the transformer; $i_{jn}$ is j-phase current at inverter-side AC bus far from the transformer. $u_{jm}$ is j-phase voltage at inverter-side AC bus close to the transformer; $u_{xm}$ is x-phase voltage at inverter-side AC bus close to the transformer; $u_{ym}$ is y-phase voltage at inverter-side AC bus close to the transformer. $u_{jn}$ is j-phase voltage at inverter-side AC bus far from the transformer, $u_{xn}$ is x-phase voltage at inverter-side AC bus far from the transformer; $u_{yn}$ is y-phase voltage at inverter-side AC bus far from the transformer. $C_m$ is the mutual capacitance between AC lines, $C_s$ is AC line-to-ground capacitance.

Preferably, the second processor of energy calculation is configured to calculate energy operation value $E_{DZ}$ according to the following formula:

$$E_{DZ} = \int_{t_1}^{t_2}\left(i_{jm}\left(t-\frac{T}{4}\right) - i_{jn}\left(t-\frac{T}{4}\right)\right)\cdot\Delta u_m(t)dt$$

$\Delta u_m(t) =$

-continued $$\rho\left(R_s i_{jm}(t) + R_m(i_{xm}(t) + i_{ym}(t)) + L_s \cdot \frac{di_{jm}(t)}{dt} + L_s \cdot \frac{d(i_{xm}(t) + i_{ym}(t))}{dt}\right)$$

where $$i_{xm}(t) = i_x(t) + \frac{C_m}{2} \cdot \frac{d\left(\frac{u_{jm}(t) + u_{ym}(t) -}{2u_{xm}(t)}\right)}{dt} - \frac{C_s}{2} \cdot \frac{du_{xm}(t)}{dt}$$

$$i_{ym}(t) = i_y(t) + \frac{C_m}{2} \cdot \frac{d\left(\frac{u_{jm}(t) + u_{xm}(t) -}{2u_{ym}(t)}\right)}{dt} - \frac{C_s}{2} \cdot \frac{du_{ym}(t)}{dt}$$

where $E_{DZ}$ is energy operation value. $\Delta u_m$ is the voltage drop from the relaying point at inverter-side AC bus to the fault point on fault line. $i_{xm}$ is x-phase line current at inverter-side AC bus close to the transformer; $i_{ym}$ is y-phase line current at inverter-side AC bus close to the transformer. $i_x$ is the current measured at the outlet of x-phase line at inverter-side AC bus close to the transformer; $i_y$ is the current measured at the outlet of y-phase line at inverter-side AC bus close to the transformer. $\rho$ is the distance between the fault point and the relaying point at inverter-side AC bus. $R_s$ is the self resistance of AC line, $R_m$ is the mutual resistance between different phases of AC line, $L_s$ is the self inductance of AC line, and $L_m$ is the mutual inductance between different phases of AC line.

Through the second processor of energy calculation, the energy operation value and energy calculation value are calculated, which provides the foundation and support for the identification of fault nature of single-phase line fault. The calculation is simple and easy to implement, thus the efficiency of fault nature identification is improved, which is of great significance.

Preferably, the third processor of fault nature identification is configured to obtain the energy criterion of transient/permanent fault from the following formula:

$$|E_{cal} - E_{DZ}| < E_{set}$$

where $E_{set}$ is energy threshold value.

Preferably, the third processor of fault nature identification is configured to identify the fault nature of fault line as transient fault when energy calculation value $E_{cal}$ and energy operation value $E_{DZ}$ of the fault line satisfy the energy criterion, and the fourth processor of reclosing operation is configured to issue reclosing demand to circuit breakers on two ends of the fault line to close the circuit breakers;

the third processor of fault nature identification is configured to identify the fault nature of fault line as permanent fault when energy calculation value $E_{cal}$ and energy operation value $E_{DZ}$ of the fault line do not satisfy the energy criterion, and the fourth processor of reclosing operation is configured to block the reclosing device.

Through the third processor of fault nature identification and the fourth processor of reclosing operation, the energy criterion of transient/permanent fault is constructed to identify the fault nature of fault line. After the fault nature of fault line is obtained, the fourth processor of reclosing operation is configured to issue reclosing signal corresponding to the fault nature to circuit breakers on two ends of the fault line, so that effective reclosing of the fault line is realized. This device is simple and easy to implement, and can improve the stability and reliability of AC/DC system.

Each of the first processor, the second processor, the third processor and the fourth processor is independent processor, or all of them are integrated in a single processor.

In addition, an embodiment of this present disclosure also provides a storage medium encoded with a set of machine-executable instructions to perform a single-phase reclosing method for AC/DC system, the method comprising:

acquiring three-phase voltages at inverter-side AC bus close to the transformer $u_{am}$, $u_{bm}$, $u_{cm}$, three-phase currents measured at the outlet of inverter-side AC line $i_a$, $i_b$, $i_c$, and three-phase voltages at inverter-side AC bus far from the transformer $u_{an}$, $u_{bn}$, $u_{cn}$;

calculating energy calculation value $E_{cal}$ and energy operation value $E_{DZ}$ of the fault line, based on the acquired three-phase voltages at inverter-side AC bus close to the transformer $u_{am}$, $u_{bm}$, $u_{cm}$, three-phase currents measured at the outlet of inverter-side AC line $i_a$, $i_b$, $i_c$, and three-phase voltages at inverter-side AC bus far from the transformer $u_{an}$, $u_{bn}$, $u_{cn}$;

identifying the fault nature of fault line within the maximum time delay, according to energy calculation value $E_{cal}$ and energy operation value $E_{DZ}$ of the fault line and the energy criterion of transient/permanent fault;

issuing a reclosing control signal based on the fault nature of the fault line to realize effective reclosing of the fault line.

Those skilled in the art may understand that all or part of the process of implementing the method in the above embodiments may be completed by a computer program instructing relevant hardware, and the program may be stored in a readable computer storage medium. Wherein, the readable computer storage medium can be a magnetic disk, a light disk, a read-only storage memory or a random storage memory, etc.

The above are only preferred specific embodiments of this disclosure. However, the scope of this disclosure is not limited to the above embodiments. Any variation or substitution within the technical scope revealed by this disclosure that can be easily thought of by any technician familiar with this technical field should be covered in the protection range of this disclosure.

The foregoing descriptions of specific exemplary embodiments of the present disclosure have been presented for purposes of illustration and description. They are not intended to be exhaustive or to limit the disclosure to the precise forms disclosed, and obviously many modifications and variations are possible in light of the above teachings. The exemplary embodiments were chosen and described in order to explain certain principles of the disclosure and their practical disclosure, to thereby enable those skilled is in the art to make and utilize various exemplary embodiments of the present disclosure, as well as various alternatives and modifications thereof. It is intended that the scope of the disclosure be defined by the Claims appended hereto and their equivalents.

What is claimed is:

1. A single-phase reclosing method for an AC/DC system, comprising:
acquiring three-phase voltages $u_{am}$, $u_{bm}$, $u_{cm}$ at an inverter-side AC bus close to a transformer three-phase currents $i_a$, $i_b$, $i_c$ measured at an outlet of an inverter-side AC line, and three-phase voltages $u_{an}$, $u_{bn}$, $u_{cn}$ at the inverter-side AC bus far from the transformer;
calculating an energy calculation value $E_{cal}$ and an energy operation value $E_{DZ}$ of a fault line, based on the acquired three-phase voltages $u_{am}$, $u_{bm}$, $u_{cm}$ inverter-side AC bus close to the transformer the three-phase currents $i_a$, $i_b$, $i_c$ measured at the outlet of the inverter-side AC line, and the three-phase voltages $u_{an}$, $u_{bn}$, $u_{cn}$ at the inverter-side AC bus far from the transformer;
identifying a fault nature of the fault line within a maximum time delay, according to the energy calculation value $E_{cal}$ and the energy operation value $E_{DZ}$ of the fault line and an energy criterion of transient or permanent fault;

issuing a reclosing control signal based on the fault nature of the fault line to realize an effective reclosing of the fault line.

2. The single-phase reclosing method according to claim 1, wherein a formula used to calculate the energy calculation value $E_{cal}$ is:

$$E_{cal} = \int_{t_1}^{t_2} \left[ \left( i_{jm}\left(t - \frac{T}{4}\right) \cdot u_{jm}(t) - i_{jn}\left(t - \frac{T}{4}\right) \cdot u(_{jn}t) \right) - i_{jn}\left(t - \frac{T}{4}\right) \cdot (u_{jm}(t) - u_{jn}(t)) \right] dt$$

where $$i_{jm} = \frac{C_m}{2} \cdot \frac{d(u_{xm}(t) + u_{ym}(t) - 2u_{jm}(t))}{dt} - \frac{C_s}{2} \cdot \frac{du_{jm}(t)}{dt}$$

$$i_{jn} = \frac{C_s}{2} \cdot \frac{du_{jn}(t)}{dt} + \frac{C_m}{2} \cdot \frac{d(2u_{jn}(t) - u_{xn}(t) - u_{yn}(t))}{dt}$$

where $E_{cal}$ is the energy calculation value, $t_1$ is a start time of an integration data window, $t_2$ is an end time of the integration data window, t is a certain point in the integration data window, and T is the power-frequency period, j represents the phase of the fault line, which is one phase of a, b and c, x and y represent the other two phases of a, b and c, $i_{jm}$ is a j-phase current at the inverter-side AC bus close to the transformer; $i_{jn}$ is a j-phase current at the inverter-side AC bus far from the transformer, $u_{jm}$ is a j-phase voltage at the inverter-side AC bus close to the transformer; $u_{xm}$ is an x-phase voltage at the inverter-side AC bus close to the transformer; $u_{ym}$ is a y-phase voltage at the inverter-side AC bus close to the transformer, $u_{jn}$ is a j-phase voltage at the inverter-side AC bus far from the transformer; $u_{xn}$ is an x-phase voltage at the inverter-side AC bus far from the transformer; $u_{yn}$ is a y-phase voltage at the inverter-side AC bus far from the transformer, $C_m$ is a mutual capacitance, $C_s$ is an AC line-to-ground capacitance.

3. The single-phase reclosing method according to claim 2, wherein a formula used to calculate the energy operation value $E_{DZ}$ is:

$$E_{DZ} = \int_{t_1}^{t_2} \left( i_{jm}\left(t - \frac{T}{4}\right) - i_{jn}\left(t - \frac{T}{4}\right) \right) \cdot \Delta u_m(t) dt$$

$$\Delta u_m(t) = \rho \left( R_s i_{jm}(t) + R_m(i_{xm}(t) + i_{ym}(t)) + L_s \cdot \frac{di_{jm}(t)}{dt} + L_m \cdot \frac{d(i_{xm}(t) + i_{ym}(t))}{dt} \right)$$

where $$i_{xm}(t) = i_x(t) + \frac{C_m}{2} \cdot \frac{d\left(\frac{u_{jm}(t) + u_{ym}(t) -}{2u_{xm}(t)}\right)}{dt} - \frac{C_s}{2} \cdot \frac{du_{xm}(t)}{dt}$$

$$i_{ym}(t) = i_y(t) + \frac{C_m}{2} \cdot \frac{d\left(\frac{u_{jm}(t) + u_{xm}(t) -}{2u_{ym}(t)}\right)}{dt} - \frac{C_s}{2} \cdot \frac{du_{ym}(t)}{dt}$$

where $E_{DZ}$ is the energy operation value, $\Delta u_m$ is a voltage drop from a relaying point at the inverter-side AC bus to a fault point on the fault line, $i_{xm}$ is an x-phase line current at the inverter-side AC bus close to the transformer; $i_{xm}$ is a y-phase line current at the inverter-side AC bus close to the transformer, $i_x$ is a current measured at an outlet of an x-phase line at the inverter-side AC bus close to the transformer; $i_y$ is a current measured at an outlet of a y-phase line at the inverter-side AC bus close to the transformer, ρ is a distance between the fault point and the relaying point at the inverter-side AC bus, $R_s$ is a self resistance of the AC line, $R_m$ is a mutual resistance between different phases of the AC line, $L_s$ is a self inductance of the AC line, and $L_m$ is a mutual inductance between different phases of the AC line.

4. The single-phase reclosing method according to claim 1, wherein, the energy criterion of transient or permanent fault is:

$$|E_{cal} - E_{DZ}| < E_{set}$$

where $E_{set}$ is an energy threshold value.

5. The single-phase reclosing method according to claim 4, wherein, identifying the fault nature of the fault line within the maximum time delay according to the energy calculation value $E_{cal}$ and the energy operation value $E_{DZ}$ of the fault line and the energy criterion of transient or permanent fault comprises:

if the energy calculation value $E_{cal}$ and the energy operation value $E_{DZ}$ of the fault line satisfy the energy criterion, identifying the fault nature as a transient fault, thus a reclosing device issues a reclosing demand to circuit breakers on two ends of the fault line to close the circuit breakers;

if the energy calculation value $E_{cal}$ and the energy operation value $D_{DZ}$ of the fault line do not satisfy the energy criterion, identifying the fault nature as a permanent fault, thus the reclosing device is blocked.

6. A single-phase reclosing device for an AC/DC system, comprising:

a first processor of data acquisition, configured to acquire three-phase voltages $u_{am}$, $u_{bm}$, $u_{cm}$ at an inverter-side AC bus close to a transformer, three-phase currents $i_a$, $i_b$, $i_c$ measured at an outlet of an inverter-side AC line, and three-phase voltages $u_{an}$, $u_{bn}$, $u_{cn}$ at the inverter-side AC bus far from the transformer;

a second processor of energy calculation, configured to calculate an energy calculation value $E_{cal}$ and an energy operation value $E_{DZ}$ of a fault line according to the acquired three-phase voltages $u_{am}$, $u_{bm}$, $u_{cm}$ at the inverter-side AC bus close to the transformer, the three-phase currents $i_a$, $i_b$, $i_c$ measured at the outlet of the inverter-side AC line, and the three-phase voltages $u_{an}$, $u_{bn}$, $u_{cn}$ at the inverter-side AC bus far from the transformer;

a third processor of fault nature identification, configured to identify a fault nature of the fault line within a maximum time delay according to the energy calculation value $E_{cal}$ and the energy operation value $E_{DZ}$ of the fault line and an energy criterion of transient or permanent fault;

a fourth processor of reclosing operation, configured to issue a reclosing control signal according to the fault nature of the fault line and realize an effective reclosing of the fault line.

7. The single-phase reclosing device according to claim 6, wherein, the second processor of energy calculation is configured to calculate the energy calculation value $E_{cal}$ according to the following formula:

$$E_{cal} = \int_{t_1}^{t_2} \Big[$$

-continued $$\left(i_{jm}\left(t-\frac{T}{4}\right)\cdot u_{jm}(t)-i_{jn}\left(t-\frac{T}{4}\right)\cdot u_{jn}(t)\right)-i_{jn}\left(t-\frac{T}{4}\right)\cdot(u_{jm}(t)-u_{jn}(t))\right]dt$$

where $$i_{jm} = \frac{C_m}{2} \cdot \frac{d(u_{xm}(t)+u_{ym}(t)-2u_{jm}(t))}{dt} - \frac{C_s}{2} \cdot \frac{du_{jm}(t)}{dt}$$

$$i_{jn} = \frac{C_s}{2} \cdot \frac{du_{jn}(t)}{dt} + \frac{C_m}{2} \cdot \frac{d(2u(t)-u_{jn}(t)-u_{yn}(t))}{dt}$$

Where $E_{cal}$ is the energy calculation value, $t_1$ is a start time of an integration data window, $t_2$ is an end time of the integration data window, t is a certain point in the integration data window, and T is the power-frequency period, j represents the phase of the fault line, which is one phase of a, b and c, x and y represent the other two phases of a, b and c, $i_{jm}$ is a j-phase current at the inverter-side AC bus close to the transformer; $i_{jn}$ is a j-phase current at the inverter-side AC bus far from the transformer, $u_{jm}$ is a j-phase voltage at the inverter-side AC bus close to the transformer; $u_{xm}$ is an x-phase voltage at the inverter-side AC bus close to the transformer; $u_{ym}$ is a y-phase voltage at the inverter-side AC bus close to the transformer, $u_{jn}$ is a j-phase voltage at the inverter-side AC bus far from the transformer; $u_{xn}$ is an x-phase voltage at the inverter-side AC bus far from the transformer, $u_{yn}$ is a y-phase voltage at the inverter-side AC bus far from the transformer, $C_m$ is a mutual capacitance, $C_s$ is an AC line-to-ground capacitance.

8. The single-phase reclosing device according to claim 7, wherein, the second processor of energy calculation is configured to calculate the energy operation value $E_{DZ}$ according to the following formula:

$$E_{DZ} = \int_{t_1}^{t_2}\left(i_{jm}\left(t-\frac{T}{4}\right)-i_{jn}\left(t-\frac{T}{4}\right)\right)\cdot \Delta u_m(t)dt$$

$$\Delta u_m(t) = \rho\left(R_s i_{jm}(t)+R_m(i_{xm}(t)+i_{ym}(t))+L_s \cdot \frac{di_{jm}(t)}{dt}+L_m \cdot \frac{d(i_{xm}(t)+i_{ym}(t))}{dt}\right)$$

where $$i_{xm}(t) = i_x(t) + \frac{C_m}{2} \cdot \frac{d\left(\frac{u_{jm}(t)+u_{yn}(t)-}{2u_{xm}(t)}\right)}{dt} - \frac{C_s}{2} \cdot \frac{du_{xm}(t)}{dt}$$

$$i_{ym}(t) = i_y(t) + \frac{C_m}{2} \cdot \frac{d\left(\frac{u_{jm}(t)+u_{xm}(t)-}{2u_{ym}(t)}\right)}{dt} - \frac{C_s}{2} \cdot \frac{du_{ym}(t)}{dt}$$

where $E_{DZ}$ is the energy operation value, $\Delta u_m$ is a voltage drop from a relaying point at the inverter-side AC bus to a fault point on the fault line, $i_{xm}$ is an x-phase line current at the inverter-side AC bus close to the transformer; $i_{ym}$ is a y-phase line current at the inverter-side AC bus close to the transformer, $i_x$ is a current measured at an outlet of an x-phase line at the inverter-side AC bus close to the transformer; $i_y$ is a current measured at an outlet of a y-phase line at the inverter-side AC bus close to the transformer, ρ is a distance between the fault point and the relaying point at the inverter-side AC bus, $R_s$ is a self resistance of the AC line, $R_m$ is a mutual resistance between different phases of the AC line, $L_s$ is a self inductance of the AC line, and $L_m$ is a mutual inductance between different phases of the AC line.

9. The single-phase reclosing device according to claim 8, wherein, the third processor of fault nature identification is configured to obtain the energy criterion of transient or permanent fault from the following formula:

$$|E_{cal}-E_{DZ}|<E_{set}$$

where $E_{set}$ is an energy threshold value.

10. The single-phase reclosing device according to claim 9, wherein, the third processor of fault nature identification is configured to identify the fault nature of the fault line as a transient fault when
the energy calculation value $E_{cal}$ and the energy operation value $E_{DZ}$ of the fault line satisfy the energy criterion, and the fourth processor of reclosing operation is configured to issue a reclosing demand to circuit breakers on two ends of the fault line to close the circuit breakers;
the third processor of fault nature identification is configured to identify the fault nature of the fault line as a permanent fault when the energy calculation value $E_{cal}$ and the energy operation value $E_{DZ}$ of the fault line do not satisfy the energy criterion, and the fourth processor of reclosing operation is configured to block the reclosing device.

11. A storage medium encoded with a set of machine-executable instructions to perform a single-phase reclosing method for an AC/DC system, said method comprising:
acquiring three-phase voltages $u_{am}$, $u_{bm}$, $u_{cm}$ at an inverter-side AC bus close to a transformer, three-phase currents $i_a$, $i_b$, $i_c$ measured at an outlet of an inverter-side AC line, and the three-phase voltages $u_{an}$, $u_{bn}$, $u_{cn}$ at the inverter-side AC bus far from the transformer;
calculating an energy calculation value $E_{cal}$ and an energy operation value $E_{DZ}$ of a fault line, based on the acquired three-phase voltages $u_{am}$, $u_{bm}$, $u_{cm}$ at the inverter-side AC bus close to the transformer, the three-phase currents $i_a$, $i_b$, $i_c$ measured at the outlet of the inverter-side AC line, and the three-phase voltages $u_{an}$, $u_{bn}$, $u_{cn}$ at the inverter-side AC bus far from the transformer;
identifying a fault nature of the fault line within a maximum time delay, according to the energy calculation value $E_{cal}$ and the energy operation value $E_{DZ}$ of the fault line and the energy criterion of transient or permanent fault;
issuing a reclosing control signal based on the fault nature of the fault line to realize an effective reclosing of the fault line.

\* \* \* \* \*